United States Patent
Hoffmann et al.

(10) Patent No.: US 9,517,589 B2
(45) Date of Patent: Dec. 13, 2016

(54) METHOD FOR MOUNTING ADJUSTABLE MECHANISM FOR MOTOR VEHICLE

(71) Applicant: Brose Fahrzeugteile GmbH & Co. KG, Coburg, Coburg (DE)

(72) Inventors: Matthias Hoffmann, Sesslach (DE); Andrea Bauersachs, Ebersdorf (DE); Andreas Prause, Coburg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 49 days.

(21) Appl. No.: 14/451,306

(22) Filed: Aug. 4, 2014

(65) Prior Publication Data

US 2015/0020955 A1 Jan. 22, 2015

Related U.S. Application Data (63) Continuation of application No. 10/567,882, filed as application No. PCT/DE2004/001569 on Jul. 16, 2004, now Pat. No. 8,826,756.

(30) Foreign Application Priority Data

Aug. 8, 2003 (DE) .................................. 10337475

(51) Int. Cl.
*F16H 55/22* (2006.01)
*B29C 65/00* (2006.01)
(Continued)

(52) U.S. Cl.
CPC ......... *B29C 66/344* (2013.01); *B29C 45/1671* (2013.01); *B29C 65/16* (2013.01);
(Continued)

(58) Field of Classification Search
CPC ........... Y10T 29/49465; Y10T 29/4997; Y10T 29/49945; Y10T 29/49936; Y10T 29/49464; Y10T 74/18664; B23P 15/15; B23P 2700/11; B21D 53/90; B21D 39/028; F16H 57/039; F16H 57/032; F16H 55/22; B29C 65/15; B23K 26/206

See application file for complete search history.

(56) References Cited

U.S. PATENT DOCUMENTS 1,808,044 A 6/1931 Kompa
2,128,483 A 8/1938 Hendrick
(Continued)

FOREIGN PATENT DOCUMENTS

DE 85 08 681 UI 3/1985
DE 196 30 567 A1 1/1998
(Continued)

OTHER PUBLICATIONS

Götz, "Adieu Montage", Plastverarbeiter 54, Jahrg. (2003) NR. 7, pp. 18-21, including English abstract.
(Continued)

*Primary Examiner* — Jermie Cozart
(74) *Attorney, Agent, or Firm* — Lewis Roca Rothgerber Christie LLP (57) ABSTRACT

An adjustable mechanism for a motor vehicle is used to adjust an adjustable element in a motor vehicle, especially a seating part. The mechanism includes a spindle nut comprising an axis, the spindle nut co-operating with a thread spindle and comprising external toothing on the external surface thereof which is in contact with an additional drive element. The external toothing of the spindle nut is formed by recesses in the external surface of the spindle nut which are inwardly turned in a radial manner, the teeth depths thereof diminishing in the direction of at least one axial end of the spindle nut.

19 Claims, 6 Drawing Sheets

(51) Int. Cl.

| | | |
|---|---|---|
| *B29C 45/16* | (2006.01) | |
| *B60N 2/06* | (2006.01) | |
| *B60N 2/22* | (2006.01) | |
| *B60N 2/44* | (2006.01) | |
| *F16H 57/039* | (2012.01) | |
| *B29C 65/16* | (2006.01) | |
| *B21D 53/90* | (2006.01) | |
| *F16H 1/16* | (2006.01) | |
| *F16H 25/20* | (2006.01) | |
| *F16H 57/02* | (2012.01) | |
| *B29K 105/00* | (2006.01) | |

(52) U.S. Cl.
CPC .......... *B60N 2/067* (2013.01); *B60N 2/2231* (2013.01); *B60N 2/4435* (2013.01); *F16H 55/22* (2013.01); *F16H 57/039* (2013.01); *B21D 53/90* (2013.01); *B29C 2045/1601* (2013.01); *B29K 2105/25* (2013.01); *F16H 1/16* (2013.01); *F16H 25/20* (2013.01); *F16H 2057/02086* (2013.01); *F16H 2057/02091* (2013.01); *Y10T 29/49464* (2015.01); *Y10T 29/49465* (2015.01); *Y10T 74/18664* (2015.01); *Y10T 74/19828* (2015.01)

(56) References Cited

U.S. PATENT DOCUMENTS

| | | |
|---|---|---|
| 2,201,670 A | 5/1940 | Kraus |
| 2,313,776 A | 3/1943 | Segal |
| 2,619,845 A | 12/1952 | Mackmann et al. |
| 3,323,777 A | 6/1967 | McMullen |
| 3,812,737 A | 5/1974 | Campbell et al. |
| 4,110,054 A | 8/1978 | Moeller, Jr. |
| 4,386,893 A | 6/1983 | Hauser, Jr. |
| 4,802,374 A | 2/1989 | Hamelin et al. |
| 5,222,402 A | 6/1993 | White et al. |
| 5,572,906 A | 11/1996 | Jörg |
| 5,664,457 A | 9/1997 | Nejati |
| 5,893,959 A | 4/1999 | Muellich |
| 5,924,668 A | 7/1999 | Garrido |
| 6,032,550 A | 3/2000 | Rugh |
| 6,233,815 B1 | 5/2001 | Miyake |
| 6,465,757 B1 | 10/2002 | Chen |
| 6,575,421 B1 | 6/2003 | Houston et al. |
| 7,051,986 B1 | 5/2006 | Taubmann et al. |
| 7,640,822 B2 | 1/2010 | Suzuki et al. |
| 2004/0206195 A1 | 10/2004 | Landskron et al. |
| 2005/0126333 A1 | 6/2005 | Dohles et al. |
| 2005/0269478 A1 | 12/2005 | Woehrle et al. |

FOREIGN PATENT DOCUMENTS

| | | |
|---|---|---|
| DE | 198 07 605 C1 | 12/1998 |
| DE | 198 15 283 A1 | 10/1999 |
| DE | 198 15 283 C2 | 10/1999 |
| DE | 199 24 469 A1 | 11/2000 |
| DE | 199 56 614 A1 | 5/2001 |
| DE | 100 03 305 C1 | 6/2001 |
| DE | 101 58 099 A1 | 6/2003 |
| DE | 202 20 866 U1 | 7/2004 |
| DE | 10 2004 013 009 B4 | 10/2005 |
| EP | 0 602 185 B1 | 6/1994 |
| EP | 0 683 031 A2 | 11/1995 |
| EP | 1 068 093 B1 | 1/2001 |
| EP | 0 997 261 B9 | 4/2001 |
| EP | 1 060 837 B1 | 3/2005 |
| FR | 2 580 759 A1 | 10/1986 |
| JP | 56-007723 | 2/1981 |
| JP | 63-500609 | 3/1988 |
| JP | 8-504017 | 4/1996 |
| JP | 11-19939 | 1/1999 |
| JP | 2000-120845 | 4/2000 |
| JP | 2002-21945 | 1/2002 |
| WO | WO 86/06036 A1 | 10/1986 |
| WO | WO 9951456 A1 | 10/1999 |

OTHER PUBLICATIONS

English translation of German examination report dated Mar. 4, 2013 for parallel German application No. 103 62 326.4, 5 pages.
Japanese Examination Report dated Jul. 26, 2011 for Patent No. JP 2006-522882, 2 pages, and English translation, 2 pages.
English translation of the Extended European Search Report dated Jan. 12, 2012 for Application No. 10 164 287.4, 2 pages.
English Abstract of Haberstroh E: "Laserschweissen in Der Mikrotechnik Wenig Energie Hohe Festigkeit", Plastverarbeiter, Huethig GmbH, Heidelberg, DE, Bd. 51, Nr. 9, 1. Sep. 2000, Seite 60, 62, XP000951390, ISSN: 0032-1338.
Japanese examination report dated May 11, 2010 and English translation for Patent Application No. 2006-522882.
International Search Report dated Dec. 23, 2004, corresponding to PCT/DE2004/001569.
Schmidt, "Schneckengetriebe mit Schneckenrädern aus Hostaform," Antriebstechnik, Krausskopf Verlaf Fur Wirtschaft GmbH. Mainz, De, vol. 24, No. 3, 1985, pp. 61-67, XP002108858.
Haberstroh, "Laserschweißen in der Mikrotechnik Wenig Energie hohe Festigkeit," Plastverarbeiter, Zechner Und Huethig Verlaf GmbH. Speyer/Rhein, DE, vol. 51, No. 9, Sep. 2000, pp. 60 and 62, XP000951390.
English translation of the International Preliminary Examination Report, dated Jul. 3, 2006, for corresponding PCT application PCT/DE2004/001569.
Beitz et al., "Dubbel Taschenbuch für den Maschinenbau," 16th ed. Berlin: Springer-Verlag, 1994, p. G128, 3 pages and English abstract.
Klein, Michael, Laserschweißen von Kunststoffen in der Mikrotechnik, Laser Beam Welding of Plastics in Micro Technology, Dissertation, Mar. 9, 2001, 125 pages, English summary on pp. 98-99.
English machine translation of Opposition to European Patent No. 2216566, dated Mar. 4, 2015, 6 pages.
English machine translation of Opposition against German Patent No. 10362326, dated Nov. 13, 2014, 10 pages.

METHOD FOR MOUNTING ADJUSTABLE MECHANISM FOR MOTOR VEHICLE

CROSS-REFERENCE TO A RELATED APPLICATION

This application is a continuation of application Ser. No. 10/567,882, filed Feb. 8, 2006 now U.S. Pat. No. 8,826,756 B2, which is a National Phase Patent Application of International Application Number PCT/DE2004/001569, filed on Jul. 16, 2004, which claims priority of German Patent Application Number 103 37 475.2, filed on Aug. 8, 2003, the contents of which are hereby incorporated by reference in their entirety.

BACKGROUND

The invention relates to an adjustable mechanism for a motor vehicle.

An adjustable mechanism of this kind serves for adjusting an adjustable part in a motor vehicle, more particularly a seat part, and comprises a spindle nut (able to rotate about its longitudinal axis), which has on the one side internal toothing through which it interacts with a (preferably fixed, i.e. rotationally secured) spindle and which has on the other side external toothing through which it engages with a further gearing element, more particularly a drive worm. The external toothing of the spindle nut thereby extends over its outer surface (circumferential face).

According to a preferred use this gearing can serve to move one seat part relative to another seat part, by way of example to move a first rail of a rail longitudinal guide on which is fixed a motor vehicle seat which is adjustable in the seat longitudinal direction, relative to a second rail of the rail longitudinal guide which is to be fixed on a floor assembly of the corresponding motor vehicle.

The fixed spindle is thereby fixed on one of the vehicle parts which are displaceable relative to each other, and the spindle nut together with the further gearing element and associated drive device (e.g. drive motor) are mounted on the other vehicle part. If with an arrangement of this kind the spindle nut is turned by the drive worm which is drivable through the drive device, then it is hereby moved in the longitudinal direction along the fixed spindle which leads to the desired relative movement of the two vehicle parts.

Adjustable mechanisms of this kind are required more and more in motor vehicles in order to be able to adjust the position of seat parts and other vehicle parts, such as e.g. arm rests on the door side, centre console etc and to adapt them to the requirements of different vehicle occupants.

The object of the invention is therefore to provide an adjustable mechanism of the type mentioned at the beginning which with a compact structure also has good stability whilst using the lightest possible materials.

BRIEF DESCRIPTION

According to this the external toothing of the spindle nut is formed by radially inwardly pointing (relative to the axis of the spindle nut) recesses in the external surface of the spindle nut whose tooth depths diminish towards at least one axial end of the spindle nut, more particularly and with advantage taper to zero.

An increased stability in the spindle nut is hereby reached. This is particularly important since in a crash situation considerable forces can occur on an adjustable mechanism of a motor vehicle, more particularly when using this adjustable mechanism for adjusting a seat part, but these must not lead to the spindle nut slipping through on the associated spindle. In particular notch tension effects caused by the external toothing are prevented which in a crash situation led to an increased risk of breakage. A continuous decrease in the tooth depth in the axial direction from a centre region of the toothing towards one axial end of the spindle nut is thereby advantageous. Basically however any significant sudden change in the tooth depth towards its axial end is possible.

In both cases it is preferred if the external toothing of the spindle nut extends in the axial direction only over a part of the axial extension of the outer surface of the spindle nut whereby the spindle nut has in the axial direction on the other side of the external toothing at least one ring-shaped (more particularly cylindrical) end section (of defined diameter) which is not provided with external toothing. In this case the external toothing of the spindle nut changes in the at least one axial end section towards whose axial end its tooth depth decreases, axially into a section of the spindle nut which has no external toothing, thus is free of toothed regions. This end section can be made so thin that it substantially forms a line (with minimum extension in the axial direction) which extends in a circular ring shape along the outer surface of the spindle nut.

If the spindle nut has only one axial end section which does not have external toothing, then this is preferably adjoined (in the axial direction) by that end of the external toothing where the highest mechanical strain is to be expected in a typical crash situation.

The solution according to the invention is modified in a concrete embodiment in that the spindle nut is formed at each of its axial end sections (either side of the external toothing) without toothing and forms there a cylindrical face with defined diameter. Between these two end sections of the spindle nut extends the external toothing which is formed by radially inwardly pointing recesses—in relation to the diameter of the tooth-free end sections—.

The external toothing, viewed radially, preferably does not project beyond at least one tooth-free end section of the spindle nut. Expressed in other words, the maximum radial distance of the external toothing from the longitudinal axis (centre or rotational axis) of the spindle nut is less than or possibly equal to the radius of the at least one tooth-free end section of the spindle nut.

To increase the supporting diameter when interacting with the other gearing element the external toothing of the spindle nut is preferably made more like a worm wheel toothing, thus formed substantially as globoid toothing. However a cylindrical part in the tooth path—viewed in the axial direction of the spindle nut—is designed in the centre region of the toothing for example with an involute profile in order to widen the tolerance position of the other gearing element (more particularly in the form of a worm) axially relative to the spindle nut and thereby eliminate noise problems.

The external toothing of the spindle nut is thus more particularly globoid in shape at its axial edges. It has a continuous transition from the cylindrical part into the tooth-free axial end sections of the spindle nut. This continuous transition from the cylindrical part of the external toothing to the relevant tooth-free axial end section is reached through a constant (continuous) reduction in the tooth height in the radial direction.

The measures described above which with a predetermined best possible compact design of the spindle nut also ensure a particular stability enable the spindle nut to be made (by injection moulding) from plastics, e.g. PA, POM or PEEK.

In order to increase the bearing capacity of the internal toothing (in the form of an internal thread) of the spindle nut this extends axially over a greater length than the external toothing. The internal toothing thereby extends preferably into the two end sections (tooth-free round their outer circumference) of the spindle nut.

The bearing capacity of the internal toothing (in the form of an internal thread) of the spindle nut is thereby increased in that the tooth thickness of the tooth elements of the internal toothing is greater than the gap width of the internal toothing, namely preferably twice as big or even more than twice as big. The term "toothing" is thereby to have a general meaning here so that the term "internal toothing" of the spindle nut embraces in particular an internal thread through which the spindle nut interacts with a spindle.

The spindle nut and the further gearing element, more particularly in the form of a worm, which interacts with its external toothing, are preferably mounted in a gearbox housing which consists of plates which fit together through push-fit connections, namely preferably of two pairs of opposing housing parts, more particularly in the form of plates. According to a preferred variation two housing parts of U-shaped cross-section are provided whose two end sides (each formed by the arms of the U-section housing parts) are fitted with additional housing elements, more particularly in the form of bearing plates which serve to support the two axial ends of the spindle nut. This can be provided at each axial end with a bearing collar for this purpose. Alternatively the two end sections of the spindle nut can also serve directly to mount the spindle nut in the gearbox housing. In the last case the additional bearing plates of the gearbox housing can be omitted and the two U-shaped housing plates can be used directly for supporting the spindle nut.

For a lightweight construction of the adjustable mechanism the gearbox housing is also made from plastics whereby the plastics used for the bearing plates is for optimising the friction pairing matched with the plastics used for the bearing collar of the spindle nut. Furthermore a heat-dissipating plastics or metal material is preferably used for the end bearing points (bearing plates) or for the housing as a whole.

According to a preferred embodiment of the invention the bearing openings provided in the bearing plates for the spindle nut each have an edge protruding from the relevant bearing plate in order to enlarge the bearing surface area. This is flanged by the two U-shaped housing halves of the gearbox housing for stability.

In a further preferred embodiment the gearbox housing has in at least one side boundary wall a recess in which the spindle nut, or the other gearing element interacting with the external toothing thereof, radially engages. This recess can be on the one hand a (window-shaped) opening in the corresponding boundary wall or merely an indentation. The spindle nut is thereby preferably assigned two recesses in opposing boundary walls whilst the other gearing element is assigned one recess on the side opposite the spindle nut.

It is important that these recesses are arranged radially relative to the relevant gear element (spindle nut or worm), thus are spaced in the radial direction from the rotational axis of the relevant gearing element (spindle nut or worm). They are thus not bearing openings into which the gear elements axially engage but recesses into which the gear elements project radially by their toothed regions, without being mounted therein. The structural space required for the adjustable mechanism is hereby further minimised. With the design of the recesses as openings in the relevant boundary wall it is possible to reduce the noises developing during operation still further by avoiding resonance.

Resilient elements can furthermore be mounted on the housing plates and when using a multi-component injection moulding process can be made from a different plastics than the housing plates themselves in order to provide acoustic decoupling between the gearbox housing and the associated vehicle part.

With a suitable sliding pairing as regards the bearing of the spindle nut on the gearbox housing it is possible to omit completely run-up discs for supporting the spindle nut. Where necessary steel discs are preferably used as the run-up discs which are characterised by good heat dissipation and low friction value.

Furthermore for reasons of stabilising the spindle nut on a bearing collar or each bearing collar which axially adjoins an axial end section of the spindle nut a disc or reinforcement ring can be provided which is preferably made of metal, more particularly steel. The disc or reinforcement ring has for this purpose the largest possible diameter which can coincide for example with the diameter of the outer surface of the spindle nut which is provided with the external toothing. This element can then serve at the same time as the run-up disc, thus with the aim of reducing noise.

Furthermore a cutting ring can be formed on the spindle toothing of the threaded spindle which engages through the spindle nut.

According to a preferred further development of the invention the housing parts are connected to one another more particularly in the region of their push-fit connections (additionally) through welding, more particularly ultrasound or laser welding. The material of the outer U-shaped housing plates is hereby preferably transparent for the laser beam used for welding and the material of the inner bearing plates of the gearbox housing is non-transparent (e.g. by adding carbon black) in respect of the laser beam so that a connection with the outer U-shaped housing plates can be produced by partially melting the inner bearing plates.

The gearbox housing is preferably set in a holder of U-shaped cross-section from the side arms of which project fixing flanges which serve to fix the holder (together with the gearbox housing) on the associated vehicle part, e.g. seat rail. The side arms of the holder have through openings for the threaded spindle which interacts with the spindle nut, and the holding angle is preferably made bending-elastic so that in the event of a crash it deforms in the manner of a parallelogram by bending round at the attachments of the side arms and the through openings move into engagement and jam with the spindle toothing. The reinforcement rings mentioned above (thickness less than 1 mm) can thereby also help to prevent the spindle from slipping through the through openings if in the event of a crash the housing which is preferably made of plastics is destroyed, with the reinforcement rings being pressed through the crash forces with the through openings of the side arms of the holder to thereby close same.

A method for manufacturing an adjustable mechanism according to the invention with a spindle nut consisting of plastics and a plastics gearbox housing which comprises bearing plates for the spindle nut, is characterised in that the spindle nut and at least the bearing plates are made by injection moulding in one and the same tool (in a multi-stage injection moulding process), namely preferably one after the other in two successive injection processes. The spindle nut is hereby already mounted at the end of the injection moulding process in the associated bearing points of the bearing plates of the gearbox housing. It is not necessary to then introduce the spindle nut at a later stage into the bearing points (more particularly bearing openings).

According to a variation of the method according to the invention the other gearing element (thus in particular a worm) is then placed in the tool and the two U-shaped housing halves of the gearbox housing are then also made in the same injection moulding tool. Alternatively the worm can however also be subsequently clipped into the housing after the spindle nut and gearbox housing have been made in an injection moulding tool.

With the common injection moulding of all the housing plates in one injection moulding tool the housing plates are already connected to one another during production so that no subsequent fitting together of the housing plates is required.

As an alternative however the individual housing plates can also be made separately and then fitted together. The push-fit connections are then fixed against one another by shaping round, sticking or thermal processes such as laser welding, ultrasound welding or hot caulking.

If the housing plates of the gearbox housing are connected to one another through laser welding, more particularly in the region of the push-fit connections, axial bearing play between the inner housing plates (bearing plates) of the gearbox housing and spindle nut is avoided (forced out) before or during the welding process. For this a defined axially acting force is applied to the inner housing plates (bearing plates), then those areas of the inner housing plates (bearing plates) which serve to form a push fit connection with the outer U-shaped housing plates are melted through lasers whereby the welding process is completed when a suitable force-path measurement shows that the inner bearing plates bear against the corresponding end sections of the spindle nut.

In order to enable an axial play compensation of this kind the push-fit connections are designed with axial play between the inner bearing plates and the outer U-shaped housing plates. During laser welding of the bearing plates a molten mass is formed which fills out the play-conditioned gaps and bonds with the surface of the other U-shaped outer housing plate.

A further aspect of the invention relates to a method for installing an adjustable mechanism mounted in a gearbox housing for a motor vehicle wherein at least one housing part of the gearbox housing is brought into engagement with a further housing assembly and the housing part is fixed on the further housing assembly by fusing material in the engagement area between the housing part and the further housing assembly. At the end of heating the engagement area which serves for melting same and then cooling the engagement area, the corresponding housing part is connected to the associated further housing assembly through a type of welded connection. The said elements of the gearbox housing thereby preferably consist of plastics.

This process is to be designed so that taking into account the manufacturing and assembly play which already exists the best possible defined connection is achieved between the housing plate and associated further housing assembly whilst play in the adjustable mechanism and in the bearing points of the adjustable mechanism in the gearbox housing is reduced.

In one embodiment, the housing part and the housing assembly are elastically tensioned relative to one another during fusion of the material in the engagement area. This corresponds to a welding process through the action of external pretension.

Through the action of the pretension (applied from outside) a setting movement can take place during melting whereby the housing part and the associated further assembly move relative to each other (in the pretensioning direction) under the action of the pretensioning forces so that any play which may exist in the adjustable mechanism and/or gearbox housing is compensated as much as possible and the housing part finally bears defined against the associated further housing assembly.

For this a tensioning device engages on the at least one housing part and/or further housing assembly in order to tension the housing part and the further housing assembly relative to each other. (Since the housing plate is biased by an associated tensioning device with a defined pretensioning force and the further housing assembly is fixed spatially for example, the further housing assembly is indirectly pretensioned).

In order to keep the tensioning forces as constant as possible taking into account the relative movement of the housing part and the further housing assembly the tensioning device preferably acts on the associated element of the housing with the interposition of an elastic element more particularly in the form of a compression spring.

In order to form an engagement area the at least one housing part and the further housing assembly are preferably brought into engagement with one another along an installation axis, namely preferably fitted together so that the engagement area is formed by a push-fit area, Tensioning the at least one housing part and the associated housing assembly can take place on the one side along the installation axis or on the other side also with a force component transversely to the installation axis, more particularly also as a whole perpendicular to the installation axis.

According to one embodiment of the invention a second housing part can serve as the further housing assembly whereby the two housing parts are fixed against one another directly through melting the engagement area.

According to another embodiment of the invention the further housing assembly is fitted between a first and a second housing part whereby the two housing parts are each brought into engagement with one end side of the housing assembly and fixed against the relevant associated end side by melting the material of the housing part and/or housing assembly in the engagement area of the relevant housing part with the associated end side of the housing assembly. With this embodiment of the invention the tensioning forces are preferably applied by bracing the two housing parts relative to each other whereby at least one of the housing parts is also tensioned at the same time relative to the further housing assembly.

Also with this particular embodiment the tensioning of the at least one housing part relative to the associated other housing assembly can take place in the direction of the installation axis or along a direction which has a component perpendicular to the installation axis, or along a direction which is orientated as a whole perpendicular to the installation axis.

The further housing assembly can thereby in turn be formed by two housing elements which are opposite one another, namely perpendicular to the direction along which the two aforementioned housing parts stand opposite one another.

Particularly suitable as housing parts and housing elements which are preferably made of plastics are housing plates.

To melt the material in the engagement area of the at least one housing part with the associated housing assembly it is possible to use a laser to produce a laser welding process.

Areas of the housing which are not to be melted but which are exposed to the laser beam during the welding process thereby preferably consist of a material which lets through the laser beam whilst the areas which are to be melted consist of a material which absorbs the laser beam.

The melting or welding process is thereby controlled in dependence on at least one predeterminable criterion so that a connection is reliably obtained between the housing part and the further housing assembly with specific desired properties.

For this it is possible to control the duration of the melting and welding process in dependence on the setting movement of the at least one housing part, namely for example in dependence on the speed and/or dynamics of the setting movement so that defined changes in the speed of the setting movement or defined changes in the reaction force during tensioning of the at least one housing part relative to the further assembly are used as criterion so that the melting or welding process can be terminated because the desired result has been achieved. Thus for example a sharp drop in the speed of the setting movement or a sharp rise in the reaction force during tensioning of the at least one housing part relative to the further housing assembly can clearly point to the fact that the desired setting movement has led to a play-free defined contact of the at least one housing part against the associated housing assembly.

On the other hand the duration of the melting process can also be controlled in dependence on the extent of the setting movement so that the melting process is terminated when during a setting movement of the at least one housing part relative to the further housing assembly a specific predeterminable path has been covered. This variation is particularly advantageous if the engagement area of the at least one housing part with the associated further housing assembly is formed through a push-in area and thereby one of the two push-in sections which are to be connected in the push-fit area has an oversize such that the at least one housing part and the associated further housing assembly only then bear against one another defined free of play when after melting of the oversized push-in section a setting movement of the housing plate relative to the associated further housing assembly is carried out to a certain extent, thus a certain minimum path. On the other hand the duration of the melting and welding process can also be fixed from the start based on empirical values.

A clearance is preferably provided in the engagement area (push-in area) of the at least one housing part with the further housing assembly into which the molten mass formed by the melting of the material can flow.

Furthermore it is likewise possible to check the quality of the connection between the at least one housing part and the further housing assembly, more particularly regarding the question of whether these two housing components as desired lie defined relative to each other, from the extent of the movement of the at least one housing part relative to the associated further housing assembly during the melting process. If in the engagement area of the housing part with the associated housing assembly formed as a push-in area a push-in section is consciously made with a definite oversize then the setting movement must have reached at least an extent which corresponds to the selected oversize so that a definite contact bearing between the housing components is reached. In order to ensure this it can be proposed that the power of the laser used for melting is controlled so that reaching a defined setting movement is guaranteed.

BRIEF DESCRIPTION OF THE DRAWINGS

Further features and advantages of the invention will now be apparent from the following description of embodiments illustrated in the drawings.

DETAILED DESCRIPTION

The adjustable mechanism for a motor vehicle illustrated in FIGS. 1a to 1c and 2, more particularly for adjusting the seat longitudinal position of a motor vehicle seat by a longitudinal guide rail, comprises a fixed (rotationally secured) threaded spindle 100, a spindle nut 1 mounted rotatable thereon and a drive worm 2 driving the spindle nut. The spindle nut 1 and the drive worm 2 are mounted in a gearbox housing 3, 4.

To use this gearing in a seat longitudinal adjuster which comprises two guide rails which engage in one another and are displaceable relative to each other, the fixed threaded spindle 100 is fixed on one of the two guide rails and the gearbox housing 3, 4 is mounted together with the spindle nut 1 and worm 2 on the other guide rail through a holder 5 and is connected to this guide rail. The drive worm 2 is assigned a drive (not shown in the drawings), e.g. in the form of a drive motor which during actuation triggers a rotational movement of the drive worm 2 which in turn leads to a rotational movement of the spindle nut 1 which engages with the worm toothing 25 through its external toothing 15. As a result of the interaction of the spindle nut 1 with the rotationally secured threaded spindle 100 there is a displacement of the threaded spindle 100 relative to the spindle nut 1 along the longitudinal axis L of the spindle nut 1 and threaded spindle 100. This in turn leads to a relative movement of the two guide rails along the direction L since the one guide rail is assigned to the threaded spindle 100 and the other guide rail to the spindle nut 1 and the longitudinal axis L of the spindle nut 1 and threaded spindle 100 corresponds to the adjusting direction of the guide rails which are displaceable relative to each other.

Adjustable mechanisms of this kind are known for motor vehicle seats. The special features of the adjustable mechanism illustrated in FIGS. 1a to 1c and FIG. 2 will be explained which result in a particularly compact, lightweight and at the same time stable construction of the adjustable mechanism.

The spindle nut 1 has a cylindrical contour (with an outer surface 10 formed as a cylinder sleeve) into which an external toothing 15 is worked and which is free of toothed areas at each of its two axial end sections 11, 12. The external toothing 15 of the spindle nut 1 is characterised in that compared with the tooth-free axial end sections 11, 12 of the spindle nut 1 it points inwards in the radial direction r (perpendicular to the longitudinal or rotational axis L of the spindle nut 1). This means the extension of the spindle nut 1 in the radial direction r is in the region of the external toothing 15 smaller or in sections in any case at least as large as in the tooth-free end sections 11, 12 which each bear against the external toothing 15 in the axial direction a. As an alternative the spindle nut 1 can also have only one end section without external toothing.

The at least one tooth-free axial end section 11, 12 of the spindle nut 1 can thereby be so thin in the axial direction a of the spindle nut 1 that it forms substantially a line around the outer circumference of the spindle nut 1, the external toothing 15 of the spindle nut 1 extends practically up to the outermost edge of the spindle nut and only changes into an axial end section 11 or 12 without toothed areas directly adjoining this edge.

In order to enlarge the support diameter and cross section during interaction of the external toothing 15 of the spindle nut 1 with the worm toothing 25 of the drive worm 2 mounted on a drive shaft 20, the external toothing 15 of the spindle nut 1 is made like a worm wheel toothing (globoid toothing) which means the external toothing 15 is substantially globoidal. However the centre region 16 of the external toothing 15 in the axial direction a is designed in a cylindrical part in the tooth path with a tooth profile (e.g. in the manner of an involute toothing) in order to widen the tolerance position of the drive worm 2 axially relative to the spindle nut 1 thereby avoiding problems with noise. On either side of the middle area 16 of the external toothing 15, the tooth region of the spindle nut 1 changes continuously into the tooth-free end sections 11, 12 of the spindle nut 1 through a constant radial reduction in the tooth depth (tooth height) in the axial edge regions 17, 18 of the external toothing 15.

In the case of a substantially linear tooth-free end section 11, 12 of the spindle nut 1 this means that the reduction in the tooth depth or tooth height to zero, corresponding to a transition into a tooth-free end section 11, 12 only takes place directly at the relevant axial end of the spindle nut 1. For maximum stability it is thereby advantageous that the tooth depth at at least one axial end of the spindle nut moves towards zero (assumes the value zero) so that an end section 11 or 12 without external toothing is formed there (even if thinner in the axial direction).

Overall the design of the outer surface 10 of the spindle nut 1 as described with the inwardly formed external toothing 15 which in the radial direction r does not project over the end sections 11, 12 helps considerably in increasing the stability of the spindle nut 1 which can consequently be made from plastics as a particularly lightweight material.

A special feature lies in the fact that the inner toothing 19 of the spindle nut 1 designed as a thread extends in the axial direction a over a greater length than the external toothing 15 in order to increase the bearing capacity of the thread. The internal toothing 19 (in the form of an inner thread) extends over the entire axial length of the spindle nut 1, thus along the end sections 11, 12 tooth-free on the outer side (and where applicable also along the relevant bearing collar 13, 14 which does not form a constituent part of the spindle nut in the narrower sense). Furthermore the tooth elements (threaded elements) of the inner toothing 19 (in the form of an internal thread) of the spindle nut 1 have a thickness d (extension in the axial direction a) which is greater than the gap width e, and more particularly at least twice as large, e.g. corresponding to a ratio of 70:30. Consequently the tooth elements (threaded elements) of the outer thread 109 of the threaded spindle 100 are considerably thinner than those of the inner toothing 19 (inner thread) of the spindle nut 1. For the thickness of the toothed elements (threaded elements) of the threaded spindle 100 corresponds substantially to the gap width e of the inner toothing 19 of the spindle nut 1.

The spindle nut 1 and associated drive worm 2 are mounted in a gearbox housing 3, 4 which is made of plastics and which is formed from a bearing constituent part with two bearing plates 31, 32 and an outer housing component having two housing plates 41, 42 of substantially U-shaped cross-section.

The two bearing plates 31, 32 which are made of plastics each have a bearing opening 33, 34 as the bearing point for an associated bearing collar 13, 14 of the spindle nut 1 which each protrude on the end side axially away from the spindle nut 1. The two bearing sections 33, 34 are formed by bearing openings and compared with the thickness of the bearing plates 31, 32 have an enlarged extension in the axial direction a in that a corresponding wall section 33a, 34a which engages round the relevant bearing opening 33, 34 protrudes away from and in the axial direction a perpendicular to the relevant bearing plate 31, 32. (An axial clearance of the spindle nut can hereby be minimised by sliding the bearing plates 31, 32 in the axial direction). The plastics for the bearing plates 31, 32, more particularly their bearing points 33, 34 is selected so that an optimum friction pairing is obtained during interaction with the relevant bearing collar 13, 14 of the spindle 1 which likewise consists of plastics. The associated drive worm however preferably consists of metal.

A reinforcement ring, more particularly in the form of a disc, consisting preferably of metal (steel) can be mounted on the relevant bearing collar 13, 14 and serves to stabilise the spindle nut, more particularly with a very thin axial design of the tooth-free end sections 11, 12. The diameter of a ring of this kind is selected as large as possible, more particularly so that it coincides with the diameter of the axial end sections 11, 12. The relevant ring is located seen in the axial direction a on the relevant bearing collar 13, 14 between the associated axial end sections 11, 12 of the spindle 1 and the associated bearing plates 31, 32 so that the relevant bearing plate 31, 32 can be supported through the relevant rings on the associated axial end sections 11, 12 of the spindle nut 1.

Furthermore the plastics used for manufacturing the bearing plates 3 or gearbox housing 3, 4 can be heat-conductive so that the heat which arises at the bearing points 33, 34 during operation of the adjustable mechanism can be dissipated.

The two outer housing plates 41, 42 of the gearbox housing 3, 4 which are likewise made of plastics are each formed with a U-shaped cross-section with a base surface 410, 420 as well as with side arms 411, 412 and 421, 422 which protrude away therefrom. They have at the end sides in their arms 411, 412 and 421, 422 recesses 45 which to produce a push-in connection can be pushed (slid) over the end sides 35 of the bearing plates 31, 32. In addition the U-shaped housing plates 41, 42 in the assembled state engage with curved recesses 43, 44 round the bearing sections 33, 34 of the bearing plates 3, 4 and help to stabilise same.

Figure 1A:
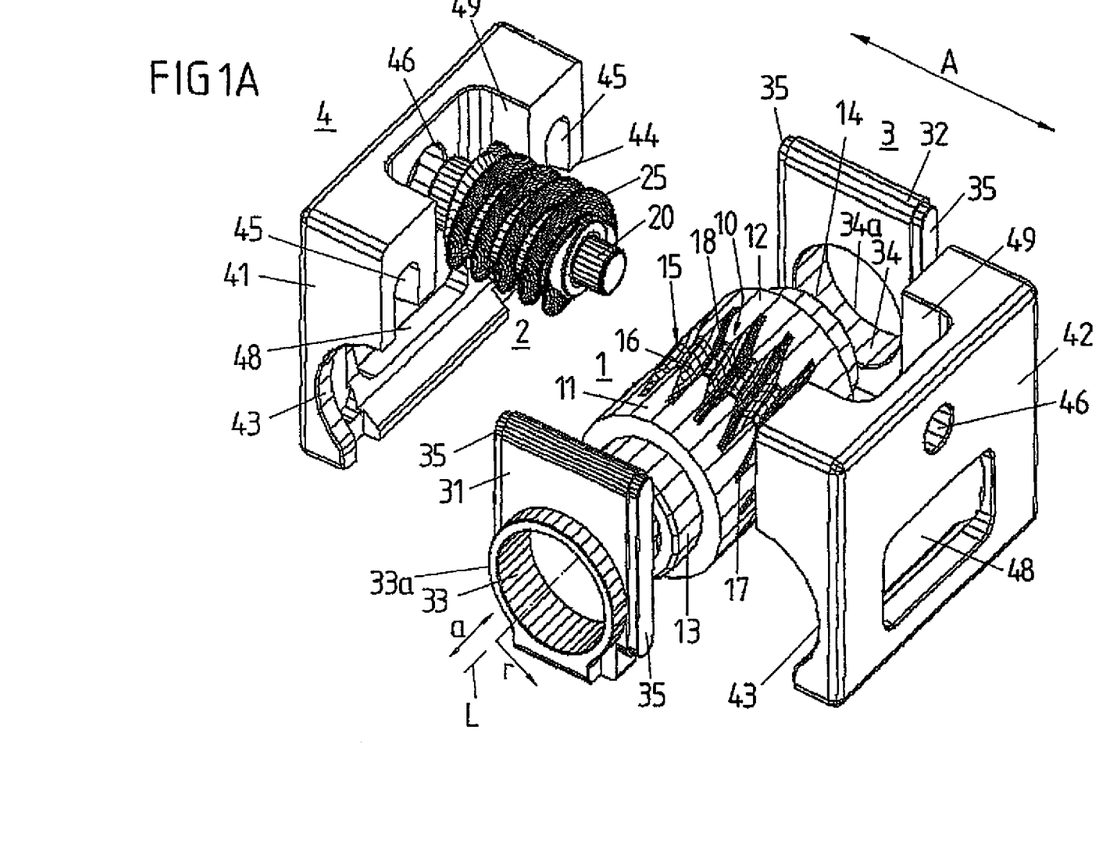
FIG. 1a is an exploded view of an adjustable mechanism for a motor vehicle with gearbox housing.
Figure 1B:
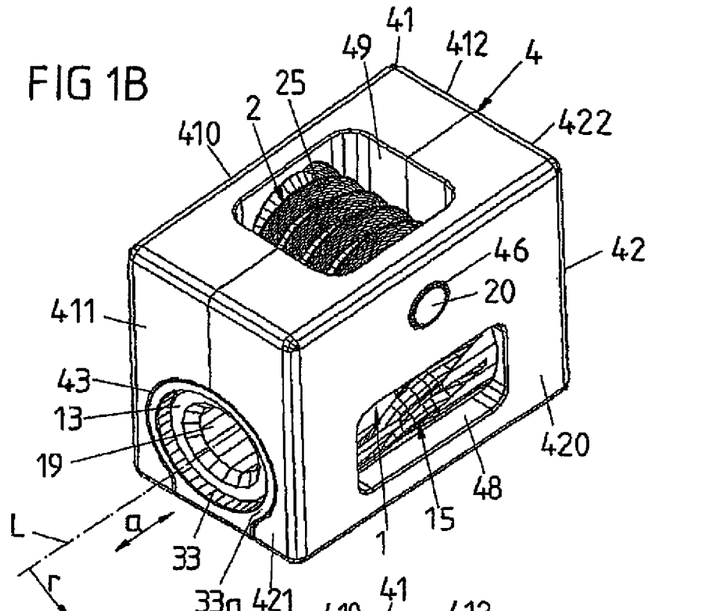
FIG. 1b is the adjustable mechanism of FIG. 1a in the assembled state.
Figure 1C:
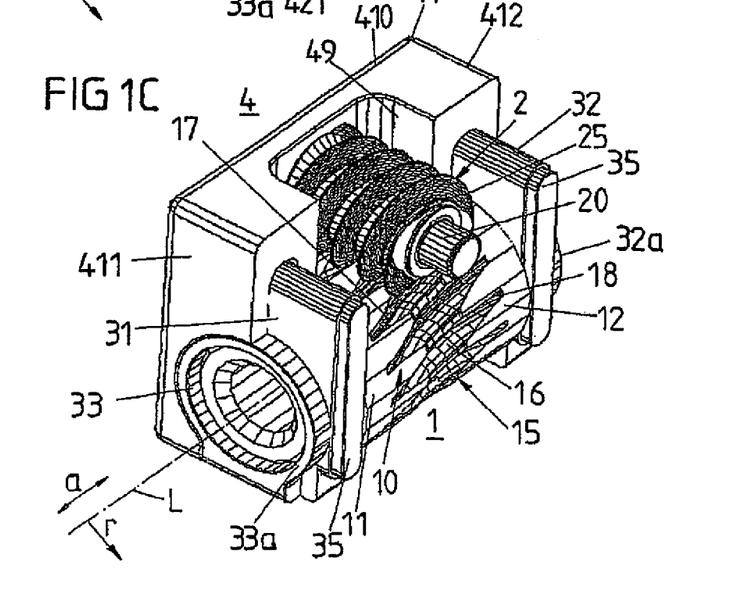
FIG. 1c is the adjustable mechanism of FIG. 1a in the assembled state, partially broken up.

As is clear from FIGS. 1*b* and 1*c* the bearing plates 31, 32 are in the assembled state of the gearbox housing 3, 4 enclosed more or less completely by the U-shaped housing plates 41, 42. To support the drive worm 2 the housing plates 41, 42 have corresponding bearing openings 46.

In a modification of the embodiment described with reference to the Figs the spindle nut 1 can also be mounted directly by their end sections 11, 12 in the gearbox housing, namely directly in circular arcuate recesses 43, 44 of the U-shaped outer housing plates 41, 42. The inner bearing plates 31, 32 can then be omitted.

Furthermore each of the two housing plates 41, 42 has in its base plate 410 and 420 a recess in the form of a window-like opening 48 in which the spindle nut 1 projects radially by its external toothing 15. The two opposing window-like openings 48 extend parallel to the longitudinal axis L (rotational axis) of the spindle nut 1 and are spaced in the radial direction r from same. They are thus aligned substantially perpendicular to the bearing openings 33, 34 for the spindle nut 1.

In a corresponding way the two U-shaped housing plates 41, 42 in the assembled state form between their arms 411, 412 and 421, 422 a further window-like opening 46 which extends parallel to the axis of rotation (drive shaft 20) of the drive worm 2 and is spaced in the radial direction from same. This enables a radial engagement of the drive worm 2 by its worm toothing 25 in the window-like opening 49 on its side remote from the spindle nut 1.

The window-like openings 48, 49 further improve the compact structure of the adjustable mechanism. For the space for the spindle nut 1 and the drive worm 2 need not be provided entirely inside the gearbox housing 3, 4 but the gear elements 1, 2 can project partially into the side boundary walls (housing plates 41, 42) of the gearbox housing. At the same time this prevents the development of noises inside the gearbox housing as a result of resonances.

Resilient elements, e.g. in the form of injection-moulded uncoupling elements can be provided on the two outer housing plates 41, 42 and where applicable the bearing plates 31, 32 in order to produce an acoustic uncoupling from the vehicle part (e.g. a seat part in the form of a guide rail) on which the gearbox housing 3, 4 is mounted and fixed. These resilient elements (decoupling elements) can when using a multi-component injection moulding process to manufacture the housing parts be made from a different plastics than the housing parts themselves. Alternatively corresponding resilient elements can also be mounted as separate component parts on the gearbox housing 3,4.

Figure 2:
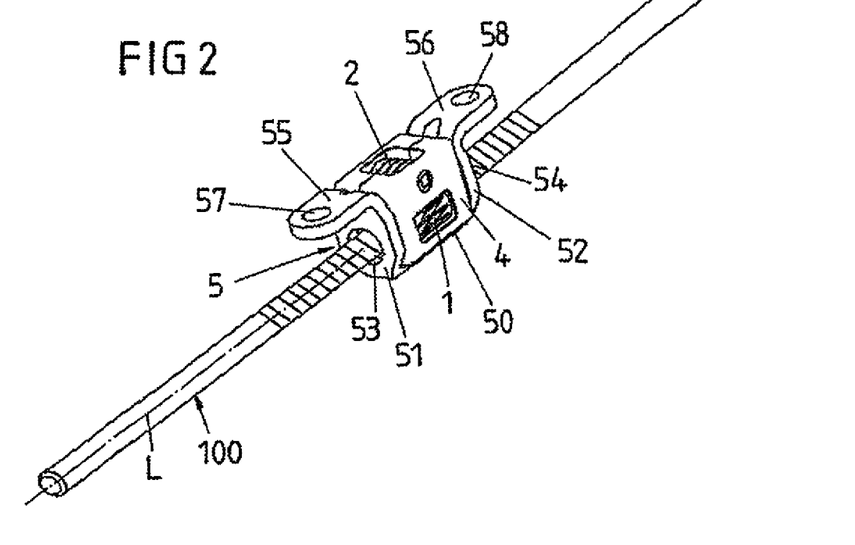
FIG. 2 is the adjustable mechanism of FIGS. 1a to 1c with an additional gearing element in the form of a spindle and with a holder.
Figure 3:
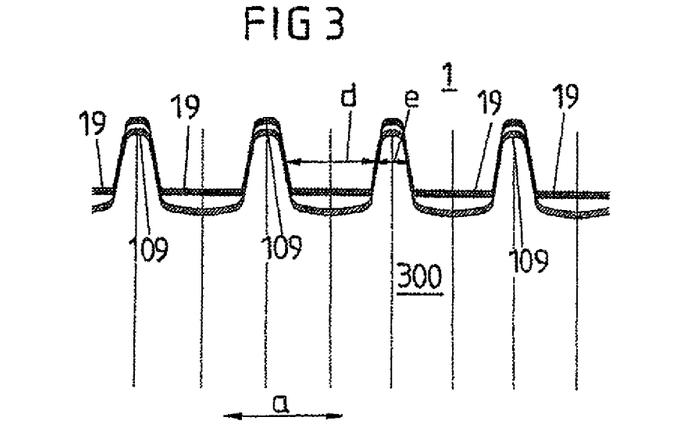
FIG. 3 is a preferred embodiment of the interengaging threads of the spindle of FIG. 2 on the one hand and the spindle of the adjustable mechanism on the other.

To fix the gearbox housing 3, 4 on a motor vehicle part in the form of a guide rail for a motor vehicle seat there is used according to FIG. 2 a holder 5 of metal of a substantially U-shaped cross-section with a base 50 and two side arms 51, 52 which each have through openings 53, 54 for the threaded spindle 100. From the two arms 51, 52 of the holder between which the housing 3, 4 is housed so that a bearing plate 33, 34 is opposite each arm (with the interposition of the arms 411, 412; 421, 422 of the U-shaped housing plates 41, 42) protrudes a fixing flange 55, 56 with a fixing point in the form of a fixing opening 57 and 58 respectively which enables the holder 5 to be fixed on a guide rail of a motor vehicle seat.

As a result of the stable construction of the adjustable mechanism 1, 2 and the associated gearbox housing 3, 4 as well as a result of the stable hold of the adjustable mechanism 1, 2 and gearbox housing 3, 4 by the arms 51, 52 of the U-shaped holder 5 a particularly high resistance of the overall arrangement to external forces, more particularly in a crash situation is reached despite the lightweight and compact structural design of the adjustable mechanism 1,2 and the gearbox housing 3,4. In a crash situation, more particularly a front or rear crash of the corresponding vehicle it must be ensured that the spindle nut 1 does not slip through along the longitudinal direction of the threaded spindle 100, for this would lead to a corresponding acceleration of the associated vehicle seat with an increased risk of injury to the seat occupant. To this end, the spindle nut 1 is held stable between the bearing plates 31, 32 and the arms 51, 52 of the U-shaped holder 5 and in a crash situation is reliably supported in the axial direction a so that it cannot slip in the direction of the longitudinal axis L along the spindle 100.

In order to manufacture the adjustable mechanism 1, 2 shown in FIGS. 1*a* to 3 with the gearbox housing 3, 4 a multi component injection moulding process is preferably used whereby all the method steps are preferably carried out in a single injection moulding tool. First the spindle nut 1 is injected in any tool and then the two bearing plates 31, 32 are injected in the same tool. During injection moulding the spindle nut 1 is hereby mounted in the two bearing plates 31, 32 so that no subsequent assembling of the bearing plates 31, 52 and the spindle nut 1 is required.

The drive worm 2 is then fitted into the injection moulding tool and the outer U-shaped housing plates 41, 42 are injected whereby (as a result of the bearing plates 31, 32 and drive worm 2 located in the injection moulding tool) already during injection moulding the connection is made with the bearing plates 31, 32 in the recesses 45 and the bearing of the drive worm 2 in the associated bearing openings 46. The complete finished gearbox housing 3, 4 can then with the adjustable mechanism 1, 2 mounted therein be removed from the injection moulding tool.

With the method steps described here it is possible to change the sequence of the process stages—depending on the design of the adjustable mechanism and the gearbox housing in individual cases—. Also the installation of the drive worm 2 can also take place only at a later date by clipping into the gearbox housing 3, 4.

Within the scope of a multi component injection moulding process different plastics can thereby be used for spindle nut 1, the bearing plates 31, 32 and the outer U-shaped housing plates 41, 42.

According to another manufacturing method the bearing plates 31, 32 and the outer U-shaped housing plates 41, 42 are made as individual parts separately from plastics (injection moulded), fitted together at their push-fit connections 35, 45 and then in the region of the push-fit connections are fixed against one another through reshaping or thermal processes such as e.g. laser welding, hot caulking, ultrasound welding or in some other way, e.g. through adhesive.

In each case the connection of the individual housing parts 31, 32; 41, 42 (thus the bearing plates 31, 32 with the outer U-shaped housing plates 41, 42) takes place solely at the push-fit connections 35, 45 by which the position of the housing parts 31, 32; 41, 42 relative to each other along all spatial directions is fixed. As connecting points between the housing parts 31, 32; 41, 42 serve preferably only the push-fit connections 35, 45 which are made and fixed either directly during injection moulding of all the housing parts in one injection moulding tool or in the case of separate injection moulding of the individual housing parts are made subsequently by fitting together and then fixed against one another in an additional connecting step.

Laser welding is particularly suitable as the additional connecting step for connecting the outer U-shaped housing plates 41, 42 with the bearing plates 31, 32 in the region of the push fit connections 35, 45. For this the outer U-shaped housing plates 41, 42 preferably consist of a transparent material for the laser beam used whilst the inner bearing plates 31, 32 absorb the corresponding laser beam and thereby fuse so that a connection is made between the inner bearing plates 31, 32 and the outer U-shaped housing plates 41, 42 in the region of the push fit connections. The desired absorption of the laser beam through the inner bearing plates 31, 32 can be achieved by adding carbon black to the material of these bearing plates.

Before or during the welding of the housing plates 31, 32; 41, 42 of the gearbox housing 3, 4 it is still possible to eliminate axial bearing play between the bearing plates 31, 32 and the spindle nut 1 by applying a defined axial force to the bearing plates 31, 32 before the welding process is completed.

A particularly advantageous method for reducing or eliminating possible play such as e.g. bearing play of the gearing elements 1, 2 of the adjustable mechanism in the associated bearing regions of the gearing housing 3, 4 and/or the play during interaction of the gear elements of the adjustable mechanism 1, 2 itself or of play in the region of the push fit connections 35, 45 of the gearbox housing 3, 4, will now be explained with reference to FIGS. 4a to 7.

Figure 4A:
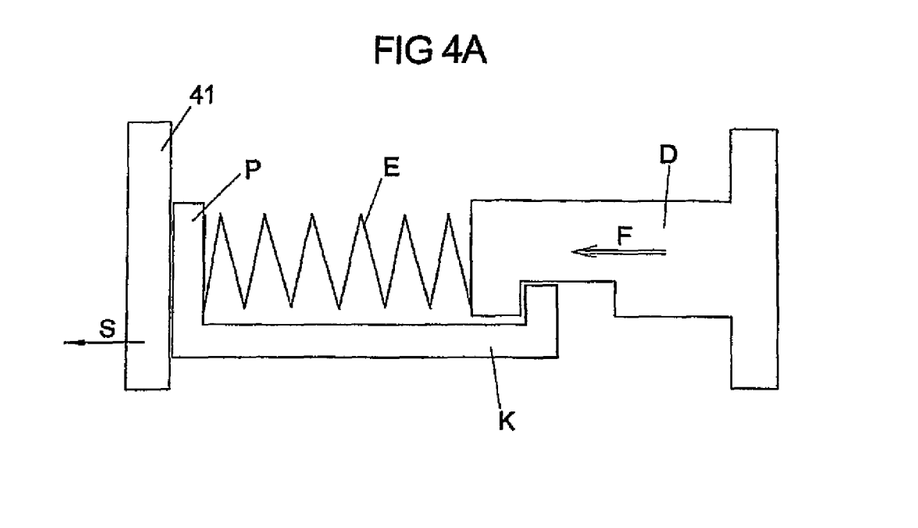
FIG. 4a is a tensioning device during action on a housing plate of the gearbox housing of FIGS. 1a to 1c during the production of a connection between this housing plate and further bearing plates of the housing through laser welding.

For this according to FIG. 4a during the fusing of the material in the region of the push fit connections 35, 45 a tension force F is exerted by a tension device on the external housing part 41 in the form of a housing plate.

The tension device comprises a tension plate P bearing against the outer side of the corresponding housing plate 41 on which through an elastic element E in the form of a compression spring a pressure-generating longitudinally movable slider D guided in a guide slide K acts with a defined tension force F. The corresponding housing plate 41 is hereby tensioned relative to the opposing housing plate 42 which is to be spatially fixed in a suitable way or likewise elastically to be pretensioned, and at the same time also tensioned relative to the housing assembly, comprising the two bearing plates 31, 32, which lies in between.

The tensioning takes place in the embodiment illustrated in FIG. 4a along the assembly axis A (see FIG. 1a) along which the outer housing plates 41, 42 can be set onto the bearing plates 31, 32 for fitting together. The tensioning can however also take place transversely to the installation direction A.

Figure 5:
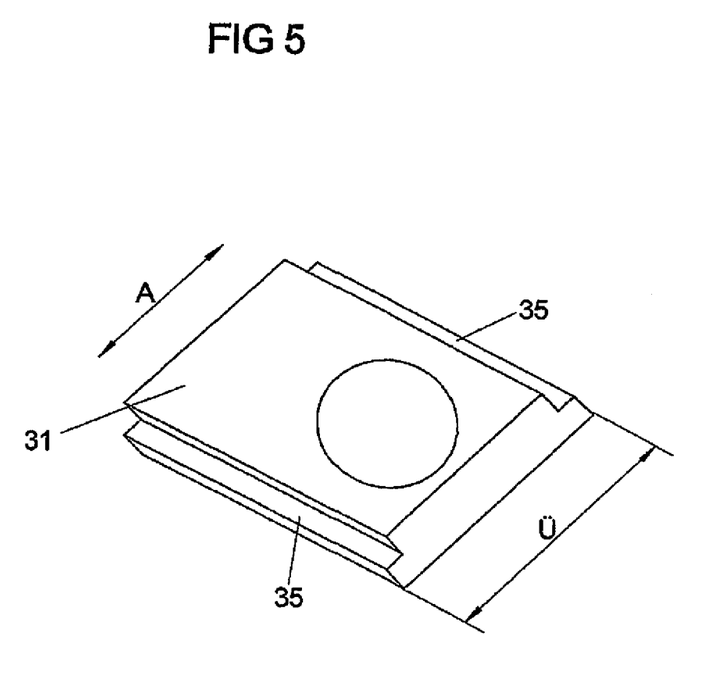
FIG. 5 is a perspective view of a bearing plate of the gearbox housing of FIGS. 1a to 1c.

As shown with reference to FIG. 5 the bearing plates 31, 32 preferably have in the installation direction A an oversize Ü i.e. the end sides 35 of the relevant bearing plates 31, 32 serving as push-in sections and formed by projections, have such an extension that the extension of the relevant bearing plate 31, 32 is greater overall along the installation axis A than provided in the finished assembled gearbox housing.

Figure 6A:
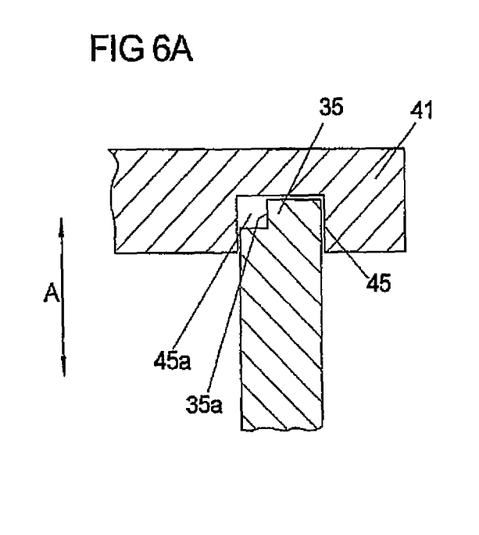
FIG. 6a is a diagrammatic view of the engagement area of a housing plate in an associated bearing plate of the housing of FIGS. 1a to 1c prior to laser welding.
Figure 6B:
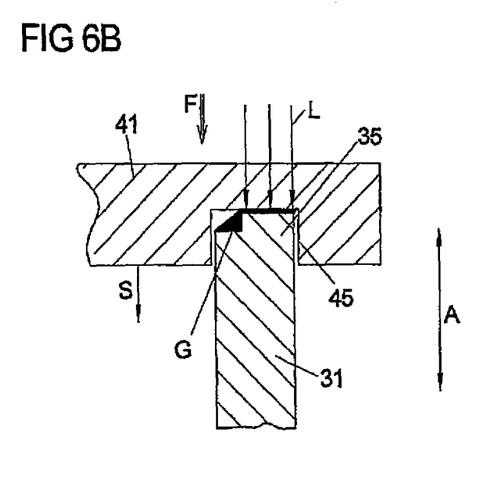
FIG. 6b is a diagrammatic view of the engagement area of a bearing plate in a housing plate of the gearbox housing of FIGS. 1a to 1c after laser welding.

This oversize is according to FIGS. 6a and 6b reduced to the final size when by a laser beam L the end sides 35 formed by projections of the bearing plates 31, 32 are melted e.g. through laser or ultra sound welding. A part of the molten material of the corresponding end side 35 of the relevant bearing plate 31 or 32 hereby flows as molten material G into a clearance 45a of the recess 45 of the corresponding housing plate 41 into which the relevant bearing plate 31 or 32 engages to form an engagement or push-in area 35, 45 at its associated end side 35. The formation of the corresponding clearance 45a is enabled through a shoulder 35a on the relevant end side 35 of each bearing plate 31, 32.

The melting process is thereby preferably set in motion after applying the pretension forces onto the elements of the housing 3, 4 provided for this purpose, e.g. on at least one of the outer housing plates 41, 42 through starting up a laser which generates the laser beam L.

Under the action of the pretension force F the housing plate 41 executes a settling movement s in the pretensioning direction along the installation axis A whereby the intended removal or reduction of play in the adjustable mechanism 1, 2 as well as in the bearing points of the gear elements of the adjustable mechanism 1,2 in the housing 3, 4 can take place.

Figure 7:
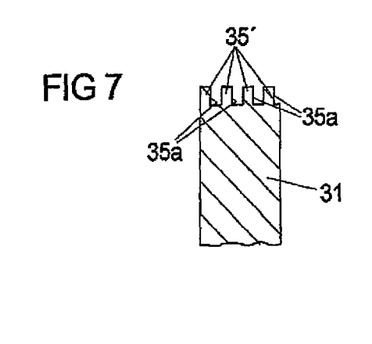
FIG. 7 is a modification of the push-in section of the bearing plate of FIGS. 6a and 6b provided for forming an engagement region.

FIG. 7 shows a modification of the end side of a bearing plate 31 which has here a number of projections 35' each forming a shoulder 35a.

So that the laser beam L can act targeted onto the projections 35 of the bearing plates 31, 32 the housing plates 41, 42 are preferably made from a material which is transparent to the corresponding laser beam L.

To control or regulate the melting process it is possible to define at least one switch-off criterion which when reached stops the melting or welding process.

For this it can be proposed by way of example that the speed and/or dynamics of the settling movement s of the housing plate 41 or 42 under pretension is monitored.

The switch-off criterion can then exist for example in that the speed of the settling movement s with which the housing plate 41 which is under pretension is moved relative to the opposite housing plate 42 or relative to the bearing plates 31, 32 falls short of a certain minimum value. This means that any existing play in the adjustable mechanism 1, 2 and in the gearbox housing 3, 4 would be removed and a stop would be approached by way of example which no longer permits any further settling movement s. This can be due to the fact for example that the housing plates 41, 42 are driven into stops of the associated end sides of the bearing plates 31, 32.

Figure 4B:
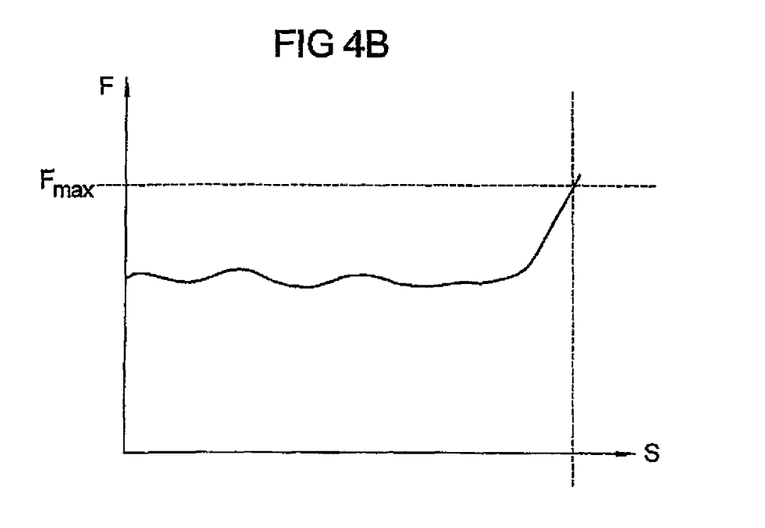
FIG. 4b is a force-path diagram for illustrating the reaction forces acting on the tensioning device during the welding process.

On the other hand the process can also be force-controlled whereby the switch off criterion according to FIG. 4b is defined by monitoring the reaction force F (whilst observing the principle of action equal reaction) which is generated through the action of the tension device on a housing plate 41. This force F is substantially constant at the start of the melting or welding process since the elastic element E in the form of a compression spring through which the tension device acts on the housing plate 41 permits a tracking of the pressure-generating slider D during the settling movement s of the housing plate 41 in the direction of the settling movement s. If finally the play compensation is concluded in as much as through the interaction of a stop with a counter stop a further settling movement s is no longer possible, then the force F rises steeply whereby reaching a maximum force $F_{max}$ serves as a switch-off criterion for terminating the melting and welding process.

Furthermore as a switch-off criterion it is also possible to use reaching a specific settling path during the settling movement s e.g. of the housing plate 41. The switch-off criterion is usually selected so that the settling path which is to be reached corresponds at least to the difference between the oversize U of the bearing plates 31, 32 along the installation axis A and the target final measurement once the gearbox housing has been assembled, thus in particular also after conclusion of the melting or welding process.

Furthermore a particularly simple switch-off criterion can also be defined in that a certain time length of the melting and welding process is predetermined, thus the laser triggering the process is only operated for a certain predetermined time span.

Even if one of the other switch-off criterion which is not based on reaching a certain minimum settling path is used, then also in these cases the reaching of a predetermined minimum settling path can be additionally used as a quality criterion, in that as a pre-requisite for a proper conclusion of the welding process it is seen that the settling movement does not fall short of a predetermined minimum settling path.

In order to ensure reaching the predetermined minimum settling path as far as possible, the laser power can be regulated in dependence on the speed of the settling movement, more particularly such that the laser power is increased when the settling speed during the welding process lies below a predetermined normal value, and conversely the laser power is reduced when the settling speed lies above the predetermined normal value.

If the predetermined minimum settling path is not reached during the welding process, then this can be a reference to the fact that the endeavoured removal of the play has not taken place to the full extent so that the corresponding gearbox housing has to be refinished or where applicable be discarded as a faulty part.

What is claimed is:

1. A method for mounting an adjustable mechanism mounted in a gearbox housing for a motor vehicle, the method comprising:
    engaging a housing part with a further housing assembly unit along an installation axis, and
        melting an end section of the housing part with the further housing assembly unit, and tensioning the housing part and the further housing assembly unit elastically against one another along the installation axis during the melting such that the housing part and the further housing assembly unit are settled with respect to each other along the installation axis during the melting.

2. The method according to claim 1, further comprising a tension device engaging the housing part and/or the further housing assembly unit in order to tension the housing part and the further housing assembly unit relative to one another.

3. The method according to claim 2, wherein the tension device engages on an associated element of the gearbox housing with the interposition of an elastic element.

4. The method according to claim 1, wherein the housing part and the further housing assembly are tensioned relative to one another in a direction which has a direction component extending transversely or perpendicularly to the installation axis.

5. The method according to claim 1, wherein the further housing assembly unit comprises a second housing part, and wherein the housing part and the second housing part are fixed directly one against the other.

6. The method according to claim 1, wherein the further housing assembly unit is housed between the housing part and a second housing part, the method further comprising engaging whereby the two housing parts with the housing assembly unit and fixing them to the housing assembly unit such that material of at least one of the two housing parts and of the housing assembly unit is fused together, wherein the two housing parts are tensioned relative to each other wherein at least one of the two housing parts is also tensioned relative to the further housing assembly unit.

7. The method according to claim 6, further comprising tensioning the two housing parts against one another along the installation axis, relative to one another along a direction which has a direction component perpendicular to the installation axis, or relative to each other along a direction extending perpendicular to the installation axis.

8. The method according to claim 6, wherein the further housing assembly unit is formed by two housing elements which are opposite one another and oriented perpendicular to the two housing parts.

9. The method according to claim 1, wherein the housing part comprises a housing plate.

10. The method according to claim 1, wherein during melting of the material the at least one housing part settles relative to the further housing assembly unit, wherein the settling occurs in a direction of an elastic pretension.

11. The method according to claim 1, wherein the material is melted by a laser, wherein non-melting areas of the housing are made from material which is permeable to a laser beam of the laser.

12. The method according to claim 1, wherein a duration of the melting process is controlled from a predeterminable criterion.

13. The method according to claim 12, wherein the duration of the melting process is controlled in dependence on a settling of the at least one housing part, particularly in dependence on a speed or the dynamics of the settling, or on the extent of the settling, or in dependence on a change in a reaction force during tensioning of the housing part relative to the further housing assembly unit.

14. The method according to claim 12, wherein the duration of the melting process is fixed at a start of the melting process.

15. The method according to claim 1, wherein a clearance is defined between the housing part and the further housing assembly unit, the clearance configured to accommodate a melted mass formed by the melting of the material.

16. The method according to claim 15, wherein the clearance is defined by a push-in area.

17. The method according to claim 1, further comprising monitoring a quality of a connection between the housing part and the further housing assembly unit during the melting process with respect to movement of the housing part relative to the further housing assembly unit.

18. The method according to claim 17, wherein the melting is accomplished by using a laser, wherein the laser is regulated in dependence on the speed of the settling.

19. The method according to claim 1, wherein the housing part and the further housing assembly unit comprise plastics.

* * * * *

UNITED STATES PATENT AND TRADEMARK OFFICE
CERTIFICATE OF CORRECTION

| | |
|---|---|
| PATENT NO. | : 9,517,589 B2 |
| APPLICATION NO. | : 14/451306 |
| DATED | : December 13, 2016 |
| INVENTOR(S) | : Matthias Hoffmann et al. |

It is certified that error appears in the above-identified patent and that said Letters Patent is hereby corrected as shown below:

In the Claims

Column 16, Line 8, Claim 6     Delete "whereby"

Signed and Sealed this
Twenty-seventh Day of March, 2018

Andrei Iancu
*Director of the United States Patent and Trademark Office*